April 17, 1956  E. H. JOHNSON  2,742,213
WATER BAG BRACKET
Filed Dec. 14, 1953
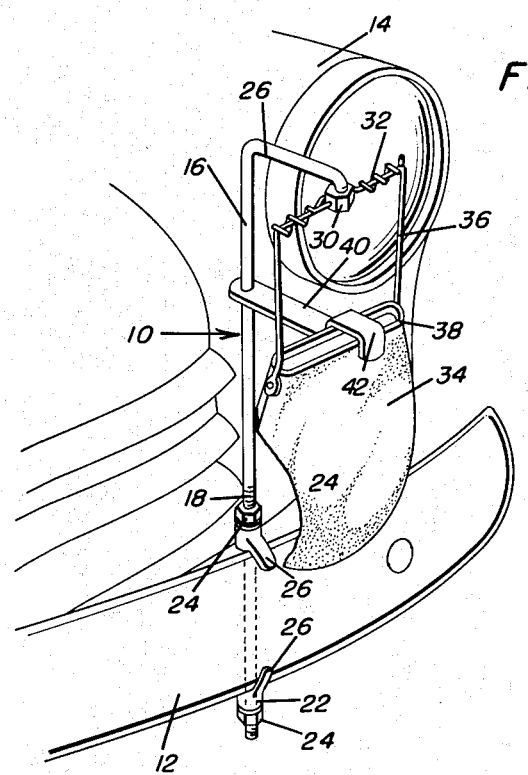
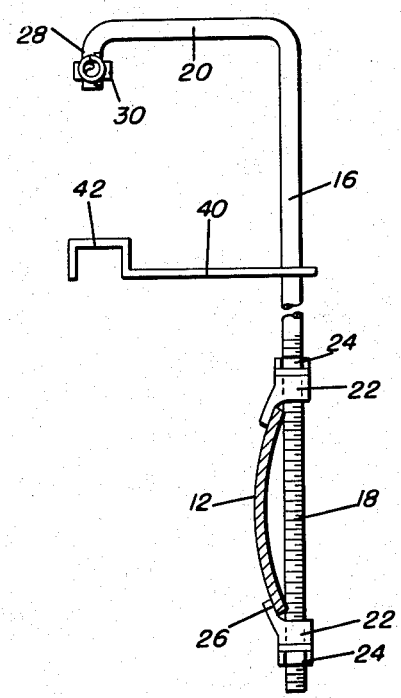
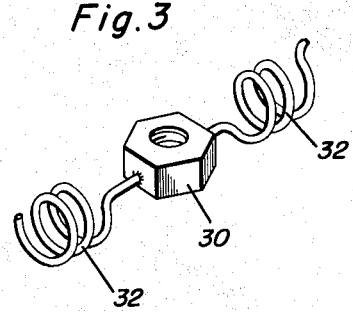
Eugene H. Johnson
INVENTOR.

United States Patent Office 2,742,213
Patented Apr. 17, 1956

2,742,213

WATER BAG BRACKET

Eugene H. Johnson, Cory, Colo.

Application December 14, 1953, Serial No. 397,818

2 Claims. (Cl. 224—42.03)

This invention relates to new and useful improvements in water bag brackets for carrying water bags on vehicle bumpers.

An important object of this invention is to provide a water bag bracket having means for clamping the bracket to a bumper support of an automobile and including an upwardly extending water bag supporting rod having means at its upper end for easily and quickly attaching the carrying strap or handle of a water bag thereto.

Another object of the invention is to provide attaching means for the upstanding water bag support which includes a clamping device adapted for attaching to a vehicle bumper for easy assembly of the bracket on the bumper.

A further object of this invention is to provide a water bag bracket of simple and practical construction, which is strong and durable, and attractive in appearance, relatively inexpensive to manufacture and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the water bag bracket of this invention mounted upon the bumper of a vehicle;

Figure 2 is a side elevational view showing the water bag bracket of this invention with the automobile bumper in section; and Figure 3 is a detail perspective view showing the water bag handle supporting means.

Referring now specifically to the drawings, it will be seen that the numeral 10 generally designates the water bag bracket of this invention mounted upon a vehicle bumper 12 in spaced relation to the vehicle body 14. The water bag bracket 10 includes a vertically extending elongated rod 16 having a threaded lower end portion 18 and a right angular bent upper end portion 20. A pair of longitudinally spaced clamping members 22 are slidably received over the lower end portion 18 of the rod 16 and clamping nuts 24 are positioned exteriorly of the clamping members 22. The members 22 have inwardly projecting hook members 26 for engagement over the edges of the vehicle bumper 12 and the clamping members 22 are slidably received on the threaded portion 18 and the nuts 24 are threadably engaged with the threaded portion 18 wherein the clamp members 22 may be moved relative to each other for easy assembly or disassembly in relation to the bumper 12. The remote end of the right angular bent portion 20 is provided with a depending threaded portion 28 receiving a nut 30 thereon and, it will be seen in Figure 3, that the nut 30 has a pair of spiral wire members 32 thereon with each one of the members 32 projecting from sides thereof at right angles to the rod 16. The spiral members 32 are secured to the nut 30 by any suitable welding means. A water bag 34 having a handle 36 and a mouth portion 38 is positioned on the bracket 10 by inserting the handle 36 through the spiral wound coil 32 wherein the coils 32 frictionally engage and support the handle 36 and the water bag 34. A bracket 40 is slidably positioned on the vertical portion of the elongated rod 16 and includes a U-shaped end portion 42 for engagement over the top portion 38 of the water bag 34 thereby preventing forward and rearward oscillation of the water bag 34 about the axis of the top portion of the handle member 36. It will be understood that the bracket 40 may be lifted by pressing the bracket adjacent the rod 16 and lifting upwardly and consequently, the bracket is pushed down in position by merely urging the bracket downwardly and frictionally gripping the bracket about the elongated rod 16.

The operation of the device will be readily understood. The elongated rod 16 is secured to the bumper 12 by proper manipulation of the threaded nut 24 thereby urging the clamping members 22 toward each other and in clamping engagement with the outer edges of the bumper 12. The water bag 34 is then secured to the right angular member 20 by positioning the handle 36 through the spiral members 32 and about the attaching nut 30. The bracket 40 is then pushed downwardly into engagement with the mouth portion 38 of the water bag 34 thereby securing the water bag 34 in a readily accessible and easily obtainable position. Obviously, the device may be constructed of readily obtainable materials, using accepted manufacturing procedures thereby maintaining the production cost at a minimum and enhancing the possibilities of a reasonable sale price.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A water bag carrying attachment for vehicle bumpers comprising an elongated rod having a right angular upper end portion, a pair of clamping members on the lower end of said rod for attachment to a bumper, means on said end portion for supporting a water bag, and means on said rod engaging the mouth portion of a water bag to prevent the bag from oscillating about its point of attachment to said end portion, said supporting means including a pair of laterally projecting coil spring members for surrounding a handle of a water bag.

2. The structure as defined in claim 1, wherein said mouth portion engaging means includes a vertically slidable bracket having a U-shaped end portion for engagement with the mouth portion of the bag.

References Cited in the file of this patent

UNITED STATES PATENTS

| | | |
|---|---|---|
| 1,689,436 | Hodge | Oct. 30, 1928 |
| 2,432,732 | Del Cano | Dec. 17, 1947 |
| 2,628,750 | Palmer | Feb. 17, 1953 |
| 2,640,635 | Garrett | June 2, 1953 |
| 2,645,393 | Campbell | July 14, 1953 |